US010805843B2

(12) United States Patent
Ma

(10) Patent No.: US 10,805,843 B2
(45) Date of Patent: Oct. 13, 2020

(54) NETWORK SWITCHING PROCESSING METHOD AND DEVICE

(71) Applicant: ZTE CORPORATION, Shenzhen (CN)

(72) Inventor: Wei Ma, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 215 days.

(21) Appl. No.: 15/316,294

(22) PCT Filed: Sep. 18, 2014

(86) PCT No.: PCT/CN2014/086869
§ 371 (c)(1),
(2) Date: Apr. 19, 2017

(87) PCT Pub. No.: WO2015/184704
PCT Pub. Date: Dec. 10, 2015

(65) Prior Publication Data
US 2017/0230872 A1 Aug. 10, 2017

(30) Foreign Application Priority Data
Jun. 6, 2014 (CN) .......................... 2014 1 0251123

(51) Int. Cl.
H04W 36/00 (2009.01)
H04W 36/14 (2009.01)
(52) U.S. Cl.
CPC ... H04W 36/0022 (2013.01); H04W 36/0016 (2013.01); H04W 36/14 (2013.01)
(58) Field of Classification Search
CPC . H04W 36/0022; H04W 36/14; H04W 48/18; H04W 36/0011; H04W 88/06; H04W 36/0005; H04W 36/0066
See application file for complete search history.

(56) References Cited

U.S. PATENT DOCUMENTS

2005/0272426 A1* 12/2005 Yang ..................... H04W 36/30
455/436
2012/0014356 A1* 1/2012 Mutikainen ........... H04W 36/14
370/331
(Continued)

FOREIGN PATENT DOCUMENTS

CN 101835223 9/2010
CN 102104848 A 6/2011
(Continued)

OTHER PUBLICATIONS

Extend European Search Report for EP 14893858.1, completed by the European Patent Office dated May 19, 2017 All together 8 Pages.
(Continued)

Primary Examiner — Asad M Nawaz
Assistant Examiner — Najeeb Ansari
(74) Attorney, Agent, or Firm — Cantor Colburn LLP

(57) ABSTRACT

A network switching processing method and device, the method including sending a switching message of switching from multimode single frequency radio voice call continuity (SRVCC) of a source network to a target network, judging whether a switching test success response message sent by a terminal in the target network is detected, and in the case where the judgement result is yes, determining that the terminal is successfully switched from the SRVCC of the source network to the target network. The method and device solve the problem whereby the verification conducted on the capability for a terminal to support SRVCC switching cannot be realized, thus achieving the effect of conducting valid verification on the SRVCC switching of a terminal.

6 Claims, 4 Drawing Sheets

(56) References Cited

U.S. PATENT DOCUMENTS

2013/0143565 A1* 6/2013 Zisimopoulos ....... H04W 36/14
455/436
2013/0242775 A1* 9/2013 Taylor ................. H04L 65/1006
370/252

FOREIGN PATENT DOCUMENTS

| CN | 102448036 A | 5/2012 |
|---|---|---|
| CN | 103298050 | 9/2013 |
| EP | 2461627 | 6/2012 |
| WO | 2010044730 | 4/2010 |
| WO | 2010122029 | 10/2010 |

OTHER PUBLICATIONS

3GPP, TS, 23.216,V12.0.0(Dec. 2013), Technical Specification, 3rd Generation Partnership Project; Technical Specification Group Services and System Aspects;Single Radio Voice Call Continuity (SRVCC), Stage 2 (Release 12).
International Search Report for PCT/CN2014/086869, English Translation attached to original, Both completed by the Chinese Patent Office dated Feb. 10, 2015, All together 6 Pages.

* cited by examiner

NETWORK SWITCHING PROCESSING METHOD AND DEVICE

CROSS-REFERENCE TO RELATED APPLICATION

This application is the U.S. national phase of PCT Application No. PCT/CN2014/086869 filed Sep. 18, 2014, which claims priority to Chinese Application No. 201410251123.2 filed Jun. 6, 2014, the disclosures of which are incorporated in their entirety by reference herein.

TECHNICAL FIELD

The present disclosure relates to the field of communication, and in particular to a network switching processing method and apparatus.

BACKGROUND

The 3GPP specification defines that the evolution objective of the LTE and the mobile network is to provide users with multimedia voice services by using the IP multimedia subsystem multimedia phone (IMS MMTel). The LTE/EPC can be regarded as the wireless broadband access network of the MMTel.

The network needs to ensure the voice service continuity of the LTE terminal when roaming to the GSM/WCDMA network. Based on the switching capability of the network and the switching capability of the terminal, when the LTE terminal is switched to the GSM/WCDMA network, if the target network can provide enough bandwidth and support the MMTel switching, then the switching among PSs can be performed based on the MMTel to ensure the voice service continuity; In addition, the 3GPP specification defines the switching technology from the PS to the CS between the LTE to the GSM/WCDMA network, that is, the dual mode single standby radio voice call continuity (Single Radio Voice Call Continuity, referred to as SRVCC), while the voice service continuity maintained during the switching by using the CS domain of the target network, and the continuous voice service is provided to the terminal users with the help of the soft switch system already owned by the operators.

Based on the SRVCC network technology, an IP-based signaling interface, Sv interface, is required to be established between the MME of the LTE core network and the soft switch server of the current network (MSC). Through the interface, the user terminal triggers the voice service switching from the PS to the CS when the user is roaming from the LTE wireless network to the GSM/WCDMA.

The bearing of the terminal user in the original LTE network may include besides the voice bearing based on the Guaranteed Bit Rate (GBR), and may also include the non-GBR data bearing, and in the situation that the network and the terminal are possessed with the condition, the corresponding processing is also required.

The simple switching process that the LTE is roaming to the GSM network and does not carry out the SRVCC of the Dual Transfer Mode (DTM) is as follows.

In S1, the mobile phone sends a measurement report to an evolved base station (e-Node B).

In S2, the evolved base station (e-Node B) determines to perform the SRVCC switching to the GSM.

In S3, the e-Node B sends a switching request.

In S4, the MME performs the separation of the voice bearing and data bearing, and performs switching to the CS domain on the GBR voice bearing of which QCI=1.

In S5, the MME sends a PS to CS switching request (containing IMSI and STN-SR number) to the MSC Server.

In S6, the MSC Server negotiates with the target MSC Server and the BSC to complete the establishment of the GSM wireless system switching circuit.

In S7, the MSC Server initiates the voice session transfer and transmission information (containing the STN-SR number) to the IMS MMTel.

In S8, the IMS MMTel performs the voice session update and the user plane bearing update.

In S9, the MSC Server sends the PS to CS switching response message to the MME.

In S10, the MME sends the switching command message to the e-NodeB.

In S11, the e-NodeB sends the switching command message to the user terminal.

In S12, the user terminal is switched to the GSM, the user terminal initiates suspending the PS service through the BSC, and the SGSN and the MME exchange the PS suspending message.

In S13, the BSC sends a switching completion message to the target MSC Server.

In S14, the MSC Server sends the switching completion message to the MME.

In S15, according to the standard process, the MME and the SGw/PGw are interconnected for performing the corresponding LTE bearing processing and suspending.

In the case with the support of the target network GSM or WCDMA and support of the terminal cell phone, the SRVCC switching may be accompanied by the PS to PS switching at the same time. The PS to CS switching will involve the S3/S4 interface or Gn interface of the network; the data services browsed in the LTE network, such as Web, can be enabled maintaining continuous in the target network by performing the PS to PS switching at the same time.

In the current SRVCC technology, there is already the existing technical scheme for the switching of the voice call. At the same time, there is also the specific technical scheme for the SRVCC switching to the UTRAN and the GSM in the voice call ringing stage. However, it is still a blank currently for the verification and testing method for the capability of the terminal supporting the SRVCC to switch to the GSM network in the voice call process.

Therefore, the problem that the verification conducted on the capability for the terminal to support the SRVCC switching is existed in the existing technology.

SUMMARY

The present disclosure provides a network switching processing method and apparatus, to at least solve the problem that the verification conducted on the capability for the terminal to support the SRVCC switching existed in the existing technology.

According to one aspect of the present disclosure, a network switching processing method is provided, including: sending a switching message of switching from multi-mode single-frequency radio voice call continuity, SRVCC, of a source network to a target network; judging whether a switching test success response message sent by a terminal in the target network is detected; and in a case that a judgment result is yes, determining that switching for the terminal switching from the SRVCC of the source network to the target network is successful.

Alternatively, before sending the switching message of switching from the SRVCC of the source network to the target network, the method further includes: determining that the terminal initiates an IP multimedia subsystem, IMS, voice call in the source network and enters a ringing stage.

Alternatively, judging whether a switching test success response message sent by a terminal in the target network is detected includes: judging whether a switching success message of successfully switching to the target network sent by the terminal in the target network is detected; in a case that a judgment result is yes, judging whether a link confirmation message of successfully establishing a link with the target network sent by the terminal in the target network is detected; and in a case that a judgment result is yes, determining that the switching test success response message sent by the terminal in the target network is detected.

Alternatively, before judging whether the link confirmation message of successfully establishing the link with the target network sent by the terminal in the target network is detected, the method further includes: determining that the terminal and the target network completes redistribution of an International Mobile Subscriber Identification Number, IMSI.

Alternatively, before judging whether the link confirmation message of successfully establishing the link with the target network sent by the terminal in the target network is detected, the method further includes: suspending an expired general packet radio service GPRS according to a request used for suspending the GPRS sent by the terminal.

Alternatively, before sending the switching message of switching from the SRVCC of the source network to the target network, the method further includes: adjusting signal strength of the target network until to satisfy the terminal reporting a measurement report.

Alternatively, before sending the switching message of switching from the SRVCC of the source network to the target network, the method further includes: receiving the measurement report reported by the terminal, and sending the switching message of switching from the SRVCC of the source network to the target network according to the measurement report.

According to another aspect of the present disclosure, a network switching processing apparatus is provided, including: a sending module, arranged to: send a switching message of switching from multimode single-frequency radio voice call continuity, SRVCC, of a source network to a target network; a first judging module, arranged to: judge whether a switching test success response message sent by a terminal in the target network is detected; and a first determination module, arranged to: in a case that a judgment result is yes, determine that switching for the terminal switching from the SRVCC of the source network to the target network is successful.

Alternatively, the apparatus further includes: a second determination module, arranged to: determine that the terminal initiates an IP multimedia subsystem, IMS, voice call in the source network, and enter a ringing stage.

Alternatively, the first judgment module includes: a first judging unit, arranged to: judge whether a switching success message of successfully switching to the target network sent by the terminal in the target network is detected; a second judging unit, arranged to: in a case that a judgment result is yes, judge whether a link confirmation message of successfully establishing a link with the target network sent by the terminal in the target network is detected; and a first determination unit, arranged to: in a case that a judgment result is yes, determine that the switching test success response message sent by the terminal in the target network is detected.

Alternatively, the apparatus further includes: a second determination unit, arranged to: determine that the terminal and the target network complete redistribution of an International Mobile Subscriber Identification Number, IMSI.

Alternatively, the apparatus further includes: a suspending unit, arranged to: suspend an expired general packet radio service GPRS according to a request used for suspending the GPRS sent by the terminal.

Alternatively, the apparatus further includes: an adjustment module, arranged to: adjust signal strength of the target network until to satisfy the terminal reporting a measurement report.

Alternatively, the apparatus further includes: a receiving module, arranged to: receive the measurement report reported by the terminal, and sending the switching message of switching from the SRVCC of the source network to the target network according to the measurement report.

Through the present disclosure, it is adopted that sending a switching message of switching from multimode single-frequency radio voice call continuity (SRVCC) of a source network to a target network; judging whether a switching test success response message sent by a terminal in the target network is detected; and in a case that a judgment result is yes, determining that switching that the terminal for switching from the SRVCC of the source network to the target network is successful; and the problem existing in the existing technology that the verification conducted on the capability for a terminal to support the SRVCC switching cannot be realized is solved, thus achieving the effect of conducting valid verification on the SRVCC switching of the terminal.

BRIEF DESCRIPTION OF DRAWINGS

The accompanying drawings described herein are used to provide further understanding for the present disclosure and constitute a part of the present application. The illustrated embodiments of the present disclosure and the description thereof are used to explain the present disclosure, rather than constituting an inappropriate limitation to the present disclosure. Herein.

SPECIFIC EMBODIMENTS

The present disclosure is described in detail with reference to the accompanying drawings and in combination with embodiments hereinafter. It should be illustrated that, in the case of not conflicting, the embodiments in the present application and features in these embodiments can be combined with each other.

Figure 1:
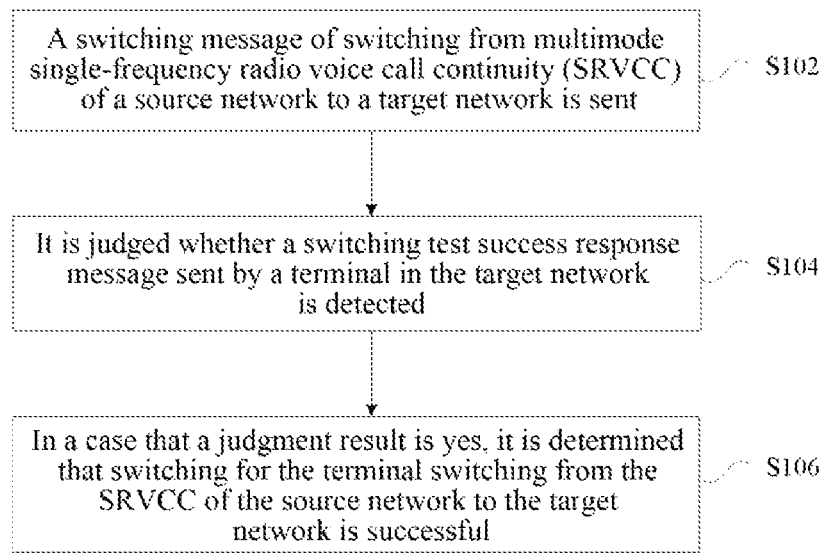
FIG. 1 is a flow chart of a network switching processing method according to an embodiment of the present disclosure.

In the embodiment of the present disclosure a network switching processing method is provided, and FIG. 1 is a flow chart of the network switching processing method according to the embodiment of the present disclosure. As shown in FIG. 1, the procedures include the following steps.

In step S102, a switching message of switching from multimode single-frequency radio voice call continuity (SRVCC) of a source network to a target network is sent.

In step S104, it is judged whether a switching test success response message sent by a terminal in the target network is detected.

In step S106, in a case that a judgment result is yes, it is determined that switching for the terminal switching from the SRVCC of the source network to the target network is successful.

Through the above steps, it is determined whether the SRVCC of the terminal is switched to the target network successfully according to whether the switching test success response message sent by the terminal is detected; the method not only solves the technical problem that the terminal is unable to verify whether the SRVCC of the terminal switching to the target network during the voice call process is successful, and thus it is able to effectively confirm performing accurate verification on whether the SRVCC of the terminal switching to the target network during the voice call process is successful, and effectively improve the SRVCC switching process.

In order to ensure the accuracy of the switching process, before sending the switching message of switching from the SRVCC of the source network to the target network, the method can further include: determining that the terminal initiates an IP multimedia subsystem (IMS) voice call in the source network and enters a ringing stage. That is, the SRVCC switching is being processed currently.

When judging whether the switching test success response message sent by the terminal in the target network is detected, appropriate processing modes can be adopted based on specific scenarios. For example, it can be first judged whether a switching success message of successfully switching to the target network sent by the terminal in the target network is detected; in a case that a judgment result is yes, it is then judged whether a link confirmation message of successfully establishing a link with the target network sent by the terminal in the target network is detected; and in a case that a judgment result is yes, it is determined that the switching test success response message sent by the terminal in the target network is detected. Only in the case that the above two judgment results are successful, it is then determined that the switching test success response message sent by the terminal in the target network, that is, it is then determined that the switching for the terminal SRVCC switching to the network is successful.

In order to ensure the accuracy of the judgment whether a link confirmation message of successfully establishing a link with the target network sent by the terminal in the target network is detected to a certain extent, before judging whether the link confirmation message of successfully establishing the link with the target network sent by the terminal in the target network is detected, it can be first determined that the terminal and the target network complete redistribution of an International Mobile Subscriber Identification Number (IMSI). In addition, before judging whether the link confirmation message of successfully establishing the link with the target network sent by the terminal in the target network is detected, it can further suspend an expired (general packet radio service) GPRS according to a request used for suspending the GPRS sent by the terminal.

In addition, in order to ensure effectively detect the switching test success response message sent by the terminal in the target network hereinafter, and not be affected by some external measurement factors, before sending the switching message of switching from the SRVCC of the source network to the target network, it can also adjust signal strength of the target network until to satisfy the terminal reporting a measurement report. And then, the measurement report reported by the terminal is received, and the switching message of switching from the SRVCC of the source network to the target network is sent according to the measurement report.

The present embodiment further provides a network switching processing apparatus, and the apparatus is used to achieve the above embodiments and alternative implementation modes, which have been illustrated and will no longer go into details. As used hereinafter, the term "module" can be a combination of software and/or hardware to achieve a predetermined function. Although the apparatus described in the following embodiments are alternatively realized by software, but the realization of hardware or a combination of software and hardware can also be possible and conceived.

Figure 2:
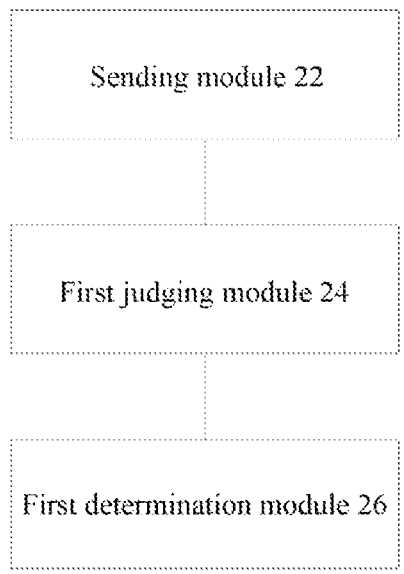
FIG. 2 is a structure block diagram of a network switching processing apparatus according to an embodiment of the present disclosure.

FIG. 2 is a structure block diagram of a network switching processing apparatus according to an embodiment of the present disclosure; as shown in FIG. 2, the apparatus includes a sending module 22, a first judging module 24 and a first determination module 26, and the apparatus is described hereinafter.

The sending module 22 is arranged to: send a switching message of switching from multimode single-frequency radio voice call continuity (SRVCC) of a source network to a target network; the first judging module 24 is connected to the above sending module 22 and arranged to: judge whether a switching test success response message sent by a terminal in the target network is detected; and the first determination module 26 is connected to the above first judging module 24 and arranged to, in a case that a judgment result is yes, determine that switching for the terminal switching from the SRVCC of the source network to the target network is successful.

Figure 3:
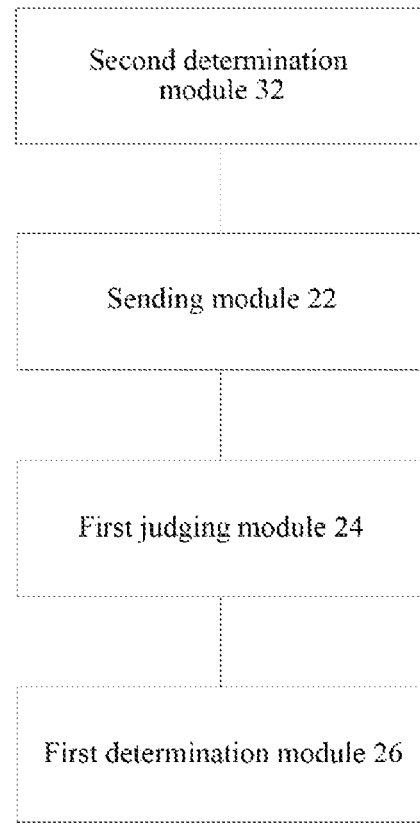
FIG. 3 is an alternative structure block diagram of a network switching processing apparatus according to an embodiment of the present disclosure.

FIG. 3 is an alternative structure block diagram of a network switching processing apparatus according to an embodiment of the present disclosure; as shown in FIG. 3, the apparatus, except including all the structures shown in FIG. 2, further includes a second determination module 32, which is described hereinafter.

The second determination module 32 is connected to the above sending module 22 and arranged to: determine that the terminal initiates an IP multimedia subsystem (IMS) voice call in the source network, and enter a ringing stage.

Figure 4:
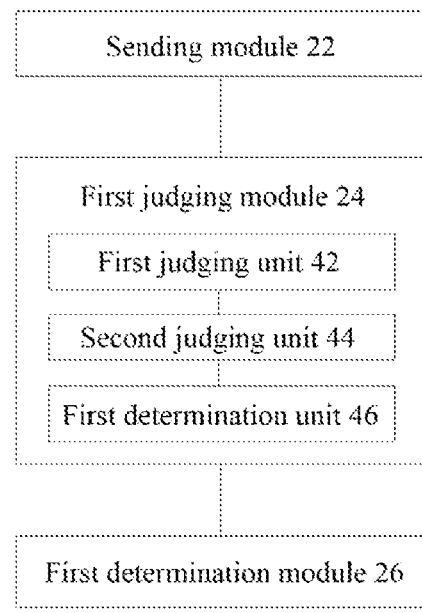
FIG. 4 is alternative structure block diagram one of a first judging module 24 in a network switching processing apparatus according to an embodiment of the present disclosure.

FIG. 4 is alternative structure block diagram one of a first judging module 24 in a network switching processing apparatus according to an embodiment of the present disclosure; as shown in FIG. 4, the first judging module 24 includes a first judging unit 42, a second judging unit 44 and a first determination unit 46, and the first judging module 24 is described hereinafter.

The first judging unit 42 is arranged to: judge whether a switching success message of successfully switching to the target network sent by the terminal in the target network is detected; the second judging unit 44 is connected to the above first judging unit 42 and arranged to: in a case that a judgment result is yes, judge whether a link confirmation message of successfully establishing a link with the target network sent by the terminal in the target network is detected; and the first determination unit 46 is connected to the above second judging unit 44 and arranged to: in a case that a judgment result is yes, determine that the switching test success response message sent by the terminal in the target network is detected.

Figure 5:
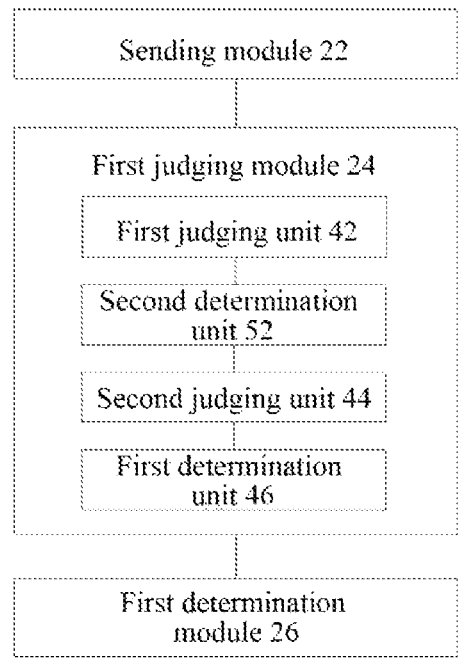
FIG. 5 is alternative structure block diagram two of a first judging module 24 in a network switching processing apparatus according to an embodiment of the present disclosure.

FIG. 5 is alternative structure block diagram two of a first judging module 24 in a network switching processing apparatus according to an embodiment of the present disclosure; as shown in FIG. 5, the first judgment module 24, except including all the structures shown in FIG. 4, further includes a second determination unit 52, which is described hereinafter.

The second determination unit 52 is connected to the above first judging unit 42 and second judging unit 44, and arranged to: determine that the terminal and the target network complete redistribution of an International Mobile Subscriber Identification Number (IMSI).

Figure 6:
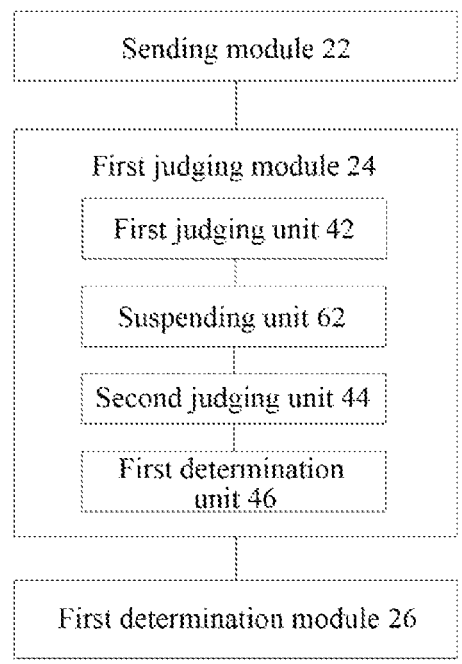
FIG. 6 is alternative structure block diagram three of a first judging module 24 in a network switching processing apparatus according to an embodiment of the present disclosure.

FIG. 6 is alternative structure block diagram three of a first judging module 24 in a network switching processing apparatus according to an embodiment of the present disclosure; as shown in FIG. 6, the first judgment module 24, except including all the structures shown in FIG. 4, further includes a suspending unit 62, which is described hereinafter.

The suspending unit 62 is connected to the above first judging unit 42 and second judging unit 44, and arranged to: suspend an expired (general packet radio service) GPRS according to a request used for suspending the GPRS sent by the terminal.

Figure 7:
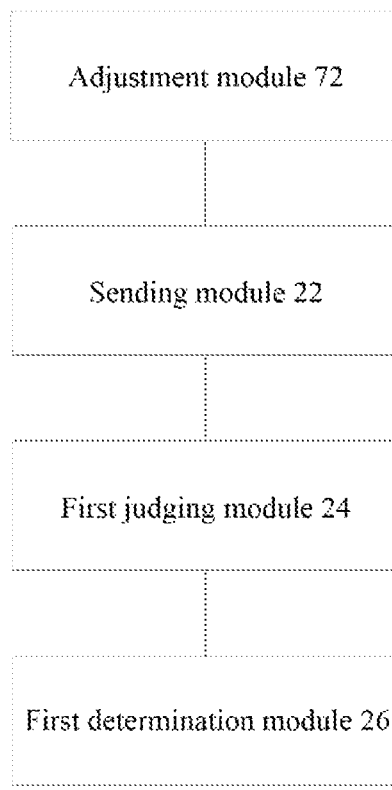
FIG. 7 is alternative structure block diagram one of a network switching processing apparatus according to an embodiment of the present disclosure.

FIG. 7 is alternative structure block diagram one of a network switching processing apparatus according to an embodiment of the present disclosure; as shown in FIG. 7, the apparatus, except including all the structures shown in FIG. 2, further includes an adjustment module 72, which is described hereinafter.

The adjustment module 72 is connected to the above sending module 22 and arranged to: adjust signal strength of the target network until to satisfy the terminal reporting a measurement report.

Figure 8:
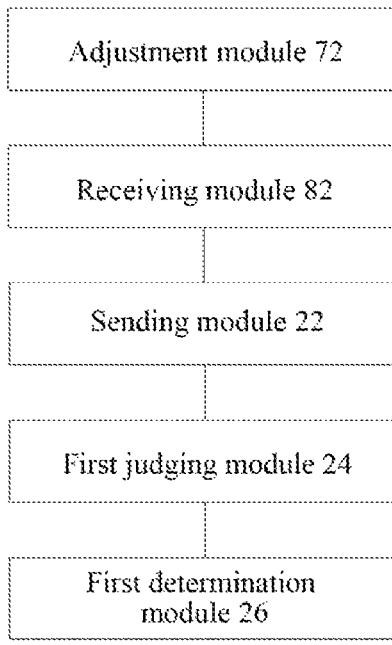
FIG. 8 is alternative structure block diagram two of a network switching processing apparatus according to an embodiment of the present disclosure.

FIG. 8 is alternative structure block diagram two of a network switching processing apparatus according to an embodiment of the present disclosure; as shown in FIG. 8, Alternatively, the apparatus, except including all the structures shown in FIG. 7, further includes: a receiving module 82, which is described hereinafter.

The receiving module 82 is connected to the above adjustment module 72 and sending module 22, and arranged to receive the measurement report reported by the terminal, and send the switching message of switching from the SRVCC of the source network to the target network according to the measurement report.

Aiming at being unable to verify the capability of supporting the SRVCC switching of the terminal in the relevant technology, the present embodiment provides a processing method of the voice call continuity in the mobile LTE communication network, that is, a determination method of determining successful switching from the SRVCC to the GSM network in the LTE IMS voice call ringing stage, and the method includes: determining that the SRVCC of the IMS voice call is switched to the GSM network successfully through detecting sending the switching completion message and a link confirmation message sent by the terminal in the GSM network. For example, if the terminal sends a switching completion confirmation message, and subsequently requests to establish a link successfully and sends the link confirmation message, then it is believed that the SRVCC of the IMS voice call is switched to the GSM network successfully. That scheme is described hereinafter.

The embodiment of the present disclosure provides a test method of switching from the SRVCC of the IMS voice call to the GSM network at the ringing stage in the LTE network, including the following operations: (1), the terminal initiates the IMS voice call in the LET network, and enters a ringing stage; (2), the network sends a message of switching from the LTE network to GSM network; (3), it is detected whether the terminal sends a message of successful switching to the GSM network; if not, then the test is failed; if yes, then the subsequent processing is continued; (4), the network sends a link message to the terminal; (5), it is detected whether the terminal sends a link confirmation message; if yes, then the test is successful; or else, the test is failed.

The terminal in the above step (1) initiating the IMS voice call and entering the ringing stage in the LTE network refers to that the terminal receives a 200 OK message which responses to a PRACK message sent by the network.

The network in the step (2) sending the message of switching from the LTE network to the GSM network requires the network to first send the wireless resource link reconfiguration message to configure measurement to the network in other mode.

The network in the step (2) sending the message of switching from the LTE network to the GSM network requires to first adjust the signal strength of the GSM network and the LTE network and satisfy the condition of the terminal to send the measurement report.

The network in the step (2) sending the message of switching from the LTE network to the GSM network requires to send the message after the network receives the measurement report sent by the terminal.

In the above test method of switching from the SRVCC of the IMS voice call to the GSM network at the ringing stage in the LTE network, in step (4), before the network sends the link message to the terminal, the terminal can send a GPRS suspending request to the network for requesting the expired GPRS.

In the above step (4), before the network sends the link message to the terminal, the terminal needs to complete the TMSI redistribution process with the network.

In the determination method of determining successful switching from the SRVCC to the GSM network in the LTE IMS voice call ringing stage, it is determined that the SRVCC of the IMS voice call is switched to the GSM network successfully through detecting the switching completion message and a link confirmation message sent by the terminal in the GSM network. It needs to be illustrated that the above network can be a system simulator simulated by a test instrument.

The alternative implementation mode is described hereinafter.

The present alternative implementation mode provides a test method of switching from the SRVCC of the IMS voice call to the GSM network at the ringing stage in the LTE network, including the following steps.

In S1, the terminal initiates the IMS voice call in the LET network, and enters a ringing stage.

In S2, the network sends a wireless connection reconfiguration message, to configure a measurement event B2 (configure the measurement for the GSM network).

In S3, the terminal sends a wireless connection reconfiguration completion message;

In S4, the cell signals of the LET network and the GSM network are adjusted, to make the cell signal of the GSM to be stronger.

In S5, the terminal sends the measurement report to the LTE cell.

In S6, the network sends a switching command from the LTE cell to the GSM cell.

In S7, it is detected whether the terminal sends a switching completion message; if not, then the test is failed, or else, S8 is entered.

In S8, the terminal sends a GPRS suspending request message.

In S9, the network sends a TMSI redistribution message.

In S10, the terminal sends a TMSI redistribution confirmation message.

In S11, the network side sends a connection message.

In S12, it is detected whether the terminal sends a link confirmation message; if not, then the test is passed; otherwise, the test is failed.

Obviously, it can be understood by those skilled in the art that each module or each step above-mentioned in the present disclosure can be implemented by the universal calculating apparatus, and they can be integrated in a single computing apparatus, or distributed in the network made up by a plurality of computing apparatus. Alternatively, they can be implemented by the executable program codes of the computing apparatus. Accordingly, they can be stored in the storage apparatus and implemented by the computing apparatus, and in some situation, the shown or described steps can be executed according to a sequence different from this place, or they are made to each integrated circuit module respectively, or a plurality of modules or steps therein are made into the single integrated circuit module to be implemented. This way, the present disclosure is not limit to any specific form of the combination of the hardware and software.

The above description is only the alternative embodiments of the present disclosure and is not intended to limit the present disclosure. For those skilled in the art, the present disclosure can have various modifications and variations. All of modifications, equivalents and/or variations without departing from the spirit and essence of the present disclosure should be embodied in the scope of the appending claims of the present disclosure.

INDUSTRIAL APPLICABILITY

As mentioned above, through the above embodiments and alternative implementation modes, the problem existing in the existing technology that the verification conducted on the capability for a terminal to support the SRVCC switching cannot be realized is solved, thus achieving the effect of conducting valid verification on the SRVCC switching of the terminal.

I claim:

1. A network switching processing method to verify the capability of a terminal for multimode single-frequency radio voice call continuity, SRVCC, switching, comprising:
adjusting signal strength of a target network until to satisfy condition of a terminal reporting a measurement report;
receiving the measurement report reported by the terminal;
determining that the terminal initiates an IP multimedia subsystem, IMS, voice call in the source network and enters a ringing stage;
sending a switching message of switching the SRVCC of a source network to the target network according to the measurement report;
judging whether a switching success message of successfully switching to the target network sent by the terminal in the target network is detected;
in a case that the switching success message of successfully switching to the target network sent by the terminal in the target network is detected, judging whether a link confirmation message of successfully establishing a link with the target network sent by the terminal in the target network is detected;
in a case that the link confirmation message of successfully establishing the link with the target network sent by the terminal in the target network is detected, determining that a switching test success response message sent by the terminal in the target network is detected; and
determining that switching for the terminal switching from the SRVCC of the source network to the target network is successful.

2. The method according to claim 1, before judging whether the link confirmation message of successfully establishing the link with the target network sent by the terminal in the target network is detected, further comprising:
determining that the terminal and the target network completes redistribution of an International Mobile Subscriber Identification Number, IMSI.

3. The method according to claim 1, before judging whether the link confirmation message of successfully establishing the link with the target network sent by the terminal in the target network is detected, further comprising:
suspending an expired general packet radio service, GPRS, according to a request used for suspending the GPRS sent by the terminal.

4. A network switching processing apparatus to verify the capability of a terminal for multimode single-frequency radio voice call continuity, SRVCC, switching, comprising a processor and a storage device, wherein the storage device stores processor-executable programs, and the programs comprise:
an adjustment module, arranged to: adjust signal strength of a target network until to satisfy condition of a terminal reporting a measurement report;
a receiving module, arranged to: receive the measurement report reported by the terminal,
a sending module, arranged to: send a switching message of switching from the SRVCC of a source network to the target network according to the measurement report;
a first judging module, arranged to: judge whether a switching test success response message sent by the terminal in the target network is detected; and
a first determination module, arranged to: in a case that the switching test success response message sent by the terminal in the target network is detected, determine that switching for the terminal switching from the SRVCC of the source network to the target network is successful;

wherein the first judgment module comprises:

a first judging unit, arranged to: judge whether a switching success message of successfully switching to the target network sent by the terminal in the target network is detected;

a second judging unit, arranged to: in a case that the switching success message of successfully switching to the target network sent by the terminal in the target network is detected, judge whether a link confirmation message of successfully establishing a link with the target network sent by the terminal in the target network is detected; and a first determination unit, arranged to: in a case that the link confirmation message of successfully establishing a link with the target network sent by the terminal in the target network is detected, determine that the switching test success response message sent by the terminal in the target network is detected; wherein the programs further comprise:

a second determination module, arranged to: determine that the terminal initiates an IP multimedia subsystem, IMS, voice call in the source network, and enter a ringing stage.

5. The apparatus according to claim 4, further comprising:

a second determination unit, arranged to: determine that the terminal and the target network complete redistribution of an International Mobile Subscriber Identification Number, IMSI.

6. The apparatus according to claim 4, further comprising:

a suspending unit, arranged to: suspend an expired general packet radio service, GPRS, according to a request used for suspending the GPRS sent by the terminal.

\* \* \* \* \*